(12) United States Patent
Grobler

(10) Patent No.: US 8,913,985 B2
(45) Date of Patent: Dec. 16, 2014

(54) MOBILE CALL MANAGEMENT SYSTEM

(76) Inventor: Benjamin Filmalter Grobler, Pretoria (ZA)

( * ) Notice: Subject to any disclaimer, the term of this patent is extended or adjusted under 35 U.S.C. 154(b) by 0 days.

(21) Appl. No.: 13/417,740

(22) Filed: Mar. 12, 2012

(65) Prior Publication Data
US 2012/0315871 A1    Dec. 13, 2012

Related U.S. Application Data

(63) Continuation of application No. 12/516,145, filed as application No. PCT/ZA2008/000003 on Jan. 18, 2006, now abandoned.

(30) Foreign Application Priority Data

Nov. 24, 2006  (ZA) .................................. 2006/9796

(51) Int. Cl.
| | | |
|---|---|---|
| H04M 11/00 | (2006.01) | |
| G06Q 30/04 | (2012.01) | |
| H04W 12/08 | (2009.01) | |
| H04W 4/16 | (2009.01) | |
| H04W 8/18 | (2009.01) | |

(52) U.S. Cl.
CPC ................ H04W 12/08 (2013.01); *H04W 4/16* (2013.01); G06Q 30/04 (2013.01); *H04W 8/18* (2013.01)
USPC ...................................... 455/406; 379/114.22

(58) Field of Classification Search
USPC ...................................... 455/406, 414.1, 418; 379/114.22–114.26
See application file for complete search history.

(56) References Cited

U.S. PATENT DOCUMENTS

| | | | | |
|---|---|---|---|---|
| 5,325,290 | A * | 6/1994 | Cauffman et al. ............... | 705/34 |
| 5,802,157 | A * | 9/1998 | Clarke et al. ................... | 379/196 |
| 2001/0007996 | A1* | 7/2001 | Dulai et al. .................... | 709/225 |
| 2003/0023854 | A1* | 1/2003 | Novak et al. ................... | 713/182 |
| 2003/0096591 | A1* | 5/2003 | Pohutsky et al. .............. | 455/406 |
| 2003/0191711 | A1* | 10/2003 | Jamison et al. ................. | 705/40 |
| 2003/0194071 | A1* | 10/2003 | Ramian ..................... | 379/114.19 |
| 2003/0204725 | A1* | 10/2003 | Itoi et al. ....................... | 713/168 |
| 2004/0058670 | A1* | 3/2004 | Pohutsky et al. .............. | 455/406 |

\* cited by examiner

*Primary Examiner* — Nathan Taylor
(74) *Attorney, Agent, or Firm* — Michael P Pettit

(57) ABSTRACT

The invention provides a method and a system for analyzing mobile telephony connectivity transaction information by the use of a code appended to a transaction.

21 Claims, 10 Drawing Sheets

MOBILE CALL MANAGEMENT SYSTEM

This application is a continuation application of U.S. Non-Provisional application Ser. No. 12/516,145, filed May 22, 2009, which gain priority from International Application Serial No. PCT/ZA2008/000003, filed Jan. 18, 2008, and South African Application Serial No. 2006/9796, filed Nov. 24, 2006, which are incorporated herein by reference.

FIELD OF THE INVENTION

The present invention relates to telephone systems, preferably mobile telephone systems in which the subscriber units, preferably mobile units or stations, are controlled by a subscriber identity module. More specifically, the invention concerns a method in such a telephone system, wherein the subscriber identity module is utilized in a new way.

The invention is advantageously applied to a telephone system of the GSM type (Global System for Mobile Communication). Although the invention is by no means restricted to such an application, it will be described hereinafter with reference to a system of this type.

BACKGROUND OF THE INVENTION

GSM is a uniform, intelligent digital mobile telephone system which is not geographically confined to a single country. A subscriber may use any subscriber unit (Mobile Station—MS) by controlling it with the aid of a subscriber identity module (SIM), which may be an active card or a plug-in unit inserted in the subscriber unit and producing the subscriber's identity (IMSI) which is allocated to a directory number (Mobile Station International ISND number—MSISDN). Information on IMSI and MSISDN is stored, together with other information relating to the subscriber, in a home database (Home Location Register—HLR) with the operator of the network including the subscriber. The system comprises visitor databases (Visitor Location Register—VLR) and switches (Mobile Services Switching Centre—MSC). Information on an activated subscriber unit MS is temporarily stored in the VLR pertaining to the area of location of the subscriber unit MS.

Since the above concepts, as the design and operation of the system as a whole, are subjected to extensive standardization, no detailed description seems required here. Systems of the above type are widely used for service calls, but also to some extent for private calls. Distributing the costs for service and private calls usually cause problems or involves extra work.

One and the same subscription can also be used by different people, e.g. within one and the same company. Also, in this case, distributing the costs among the different people concerned may cause problems or involve extra work.

OBJECT OF THE INVENTION

The object of the present invention is to eliminate the above inconveniences and also in other respects enable a more flexible use of subscriptions and subscriber identity modules.

SUMMARY OF THE INVENTION

The invention provides a method for marking mobile origination telephone connectivity transaction which facilitates identification and classification of marked transactions in service provider billing and/or bill analysis.

Typically the connectivity transaction is a mobile telephone call and/or data connection.

The bill analysis may be performed by the service provider.

The bill analysis may be performed by a third party, such as an exchange.

The bill analysis may be performed by the consumer in which case the consumer downloads billing information including marked transactions from the service provider and utilises software to classify transactions at least into two categories, however, any number of categories may used.

The bill analysis may be performed in conjunction with a database which contains information typically found in an address book, together with any other information such as the position of the person in the company, their location, and the like.

Thus, the bill analysis may include using the database to identify transactions with the name of the person called or the like so that authorized and unauthorized calls for which an person can claim a deduction or a refund may be easily identified and categorized.

The marking of connectivity transactions, such as telephone calls and/or data connections, may be effected by transmitting a code when the connectivity transaction is initiated, during the duration thereof, or at the termination thereof, for example, with the telephone number being called.

Thus, for example, a code may be appended either as a prefix or a postfix to a telephone number when it is transmitted to the service provider for the call to be connected.

The code may be a system code which is recognised by the service provider thereby grouping call charges on the billing system according to the codes or a user code which is not recognised by the service provider but can be analysed by the user when the billing information has been downloaded.

The inventor knows that as many mobile originating calls are made when a caller is unable to take notes, for example while driving a motor car, it is later very difficult to allocate call charges for specific calls to a particularly category for accounting purposes.

The code may be termed a subscriber identity in relation to the service provider or a callee identity in relation to the caller.

The invention is thus based on the insight that a subscriber identity module can be allocated at least two different identities which are selectively activated by the user. As will be appreciated, there may be two identities, e.g. a service identity and a private identity, which belong to the same user, which seems to be the currently preferred case. However, different identities might also be used, which correspond to several potential users of the subscriber identity module.

Typically only one identity can be activated at a time, i.e. a change of identity means that the previously activated identity must first be deactivated before the new identity can be regarded as activated.

An associated home database is suitably made to store information on which identity is activated, so that calls can be set up, cost information stored and so forth in a correct way.

The service provider of the mobile telephone network may be precluded from viewing private information relating to the categorization of numbers which have been dialed.

The subscriber identity module can be so designed that the selective identity activation, i.e. the selection of identity function in the subscriber identity module, can be carried out with the aid of keys or the like provided on the subscriber unit, or with the aid of special means provided on the subscriber identity module, e.g. so-called touch contacts when the module is an active card.

The activation may then, for instance, take place in connection with the input of a so-called PIN code. In that case, each identity can be allocated a special code.

This means that a number of different users (corresponding to the number of different identities) can share the subscriber identity module employed.

It is also possible to have a user's PIN code supplemented with code elements for selecting the desired identity (for instance, service or private).

As to the allocation of directory numbers in a home database, there are different alternatives in accordance with the invention.

In a first alternative, the different identities of the subscriber identity module are allocated to one and same directory number. The home database is designed to set up calls against and register cost information etc. for the current combination of directory number and identity. For properly performing this, the home database should be informed of which identity is activated. This can be done in that only one identity can be activated at a time, so that when a 'new' identity is activated, the preceding identity is always deactivated and the home database informed thereof. Such deactivation may, for instance, be performed by using a function of the type 'Cancel IMSI', which is employed in GSM-type systems. Such deactivation means that information on this identity is cancelled from the visitor database employed, and that the home database is always informed when the identity is again activated.

It should be observed that a network operator can modify the function of his home database without coming into conflict with the standard of e.g. a system of GSM type.

In a second alternative, the different identities of the subscriber identity module are each allocated to a unique directory number. Of these directory numbers, one particular number is the subscriber's external telephone number, while the other number(s) is (are) only used in the home database and may be unknown to the subscriber and to the public. It is convenient also in this case that only one identity can be activated at a time and that the home database is informed thereof, e.g. as in the first alternative.

When there is an outgoing call, the selected and activated identity is used together with the allocated directory number in conventional manner.

For call transfer, use may, according to the invention, advantageously be made of a function of the type 'Call Forwarding Unconditional' (CFU), which is a well-known standard function adapted to be controlled by the subscriber. By adding a corresponding function, controlled by the network operator, to the home database, one or more of the subscriber's directory numbers can be supplemented for direct transfer in the event of the associated identity being non-activated and provided that the subscriber has not himself made any arrangements for other direct call transfer.

In a third alternative, which is a further development of the second alternative, two of the subscriber's directory numbers are external telephone numbers, of which one suitably is a service number and the other is a private number. Informing of the activated identity and the direct call transfer can be performed as in the second alternative.

Thus, it will be appreciated that the present invention provides several different options for a subscriber as to different identities and amounts of external telephone numbers, while using a single subscriber identity module.

The invention extends to a call categorization system including a computer and software configured to identify call markers in a call charges statement provided in electronic format by a service provider, said system configured to analyse the call charges statement and group calls which are marked in a predetermined manner in accordance with rules set in the software.

The system may permit for connectivity charges summary generation in which connectivity charges are provided in any number of desired categories in accordance with the number of connectivity transaction marker codes in use.

The software may allocate connectivity transaction charges as private or business in accordance with predetermined rules and calculate any charges, taxes, and/or surcharges in either.

The invention extends to pre-paid as well as contract mobile phone users.

In one mode, the invention operates by means of authorized and unauthorised lists of numbers in relation to a user identity.

The user may mark a number as authorized, however, the account payer may have to verify that a number is indeed authorized before it becomes a permanent part of the authorized list. Thus, the user nominates a number for the authorized list but the number only becomes authorized and forms part of the authorized list when an authorized party, such as the account payer, the subscriber, a nominee of either, or other such persons consent to the authorization.

It is possible for a number to be authorized for a limited period only.

A number may be automatically deemed to be unauthorized outside authorized hours and/or outside authorised days. Thus, all calls made on public holidays and after hours may be deemed unauthorized even if made to a number on the authorized list.

The authorised list may be modified manually from a handset or from software once the list of called numbers which have been billed has been downloaded.

The system may allocate the actual cost of free calls and included calls (calls pre-paid as part of a bundle or a contract) according to the authorised and unauthorised lists, or according to any other classification rules together with the actual costs of the included calls for accounting purposes. Likewise, the VAT and other charges and taxes may be allocated.

The analysis of authorized and unauthorized calls may provide a detailed breakdown of authorized calls but provide only a total for unauthorized calls. This may protect a callers privacy.

The invention extends to a software solution in which:
data fields are linked to a payroll management system;
the data fields include fields such as
   private calls
   business calls
   nominated but not yet authorized calls
   cost centre code
   VAT amounts
   Call charges
the software then either reimburses an employee or contractor for an authorized portion of a pre-paid bill or deducts unauthorized calls from a payment due to the employee or contractor; and
costs are allocated in ledgers etc. by payroll code and by cost centre code as are VAT and other charges.

The invention extends further to linking the authorized and unauthorized numbers to the internal device memory of a user so that when an incoming call is received the device can determine whether the call is from an authorized and unauthorized number and either decline the call, forward the call, or allow the call to be answered in response to preset rules on the device.

Thus, the inventor believes, it is an advantage of the invention that when a salary package of an employee is structured, the structure can provide for reimbursing the employee for actual calls made rather than providing a capped allowance as is currently the practice and which may be questioned by the receiver of revenue, for example SARS.

DESCRIPTION OF EMBODIMENTS OF THE INVENTION

Without in anyway limiting the invention, the attached flowsheets FIGS. 1 to 9 describe embodiments of the invention together with some generic principles of the invention.

Thus, the invention should not be limited in scope by the flowsheets and the disclosure in the flowsheets forms an integral part of the summary of the invention as if specifically reproduced there.

Figure 1:
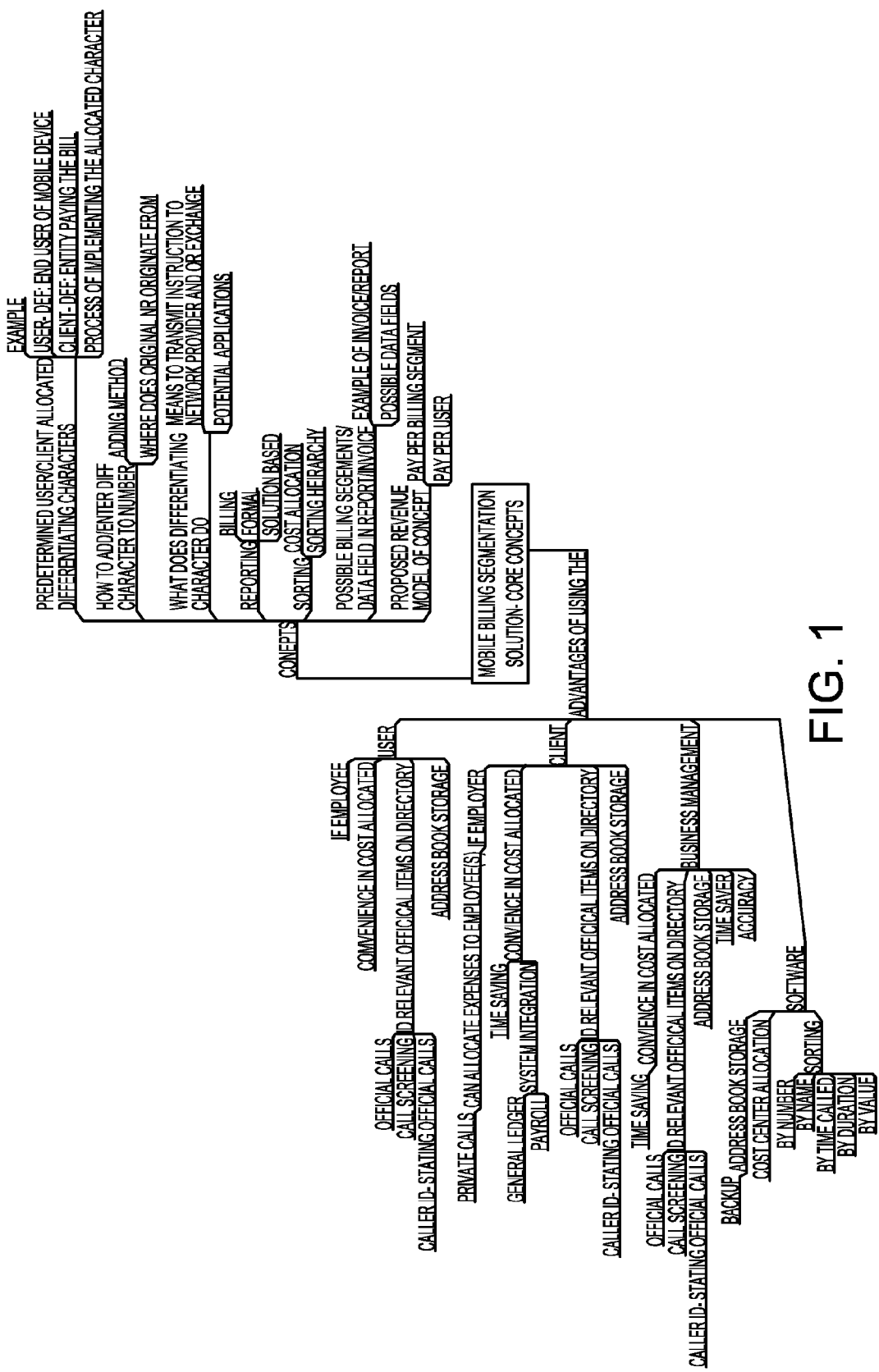
FIG. 1 shows a flowsheet of the core concepts of a mobile billing segment solution in accordance with the present invention.
Figure 2:
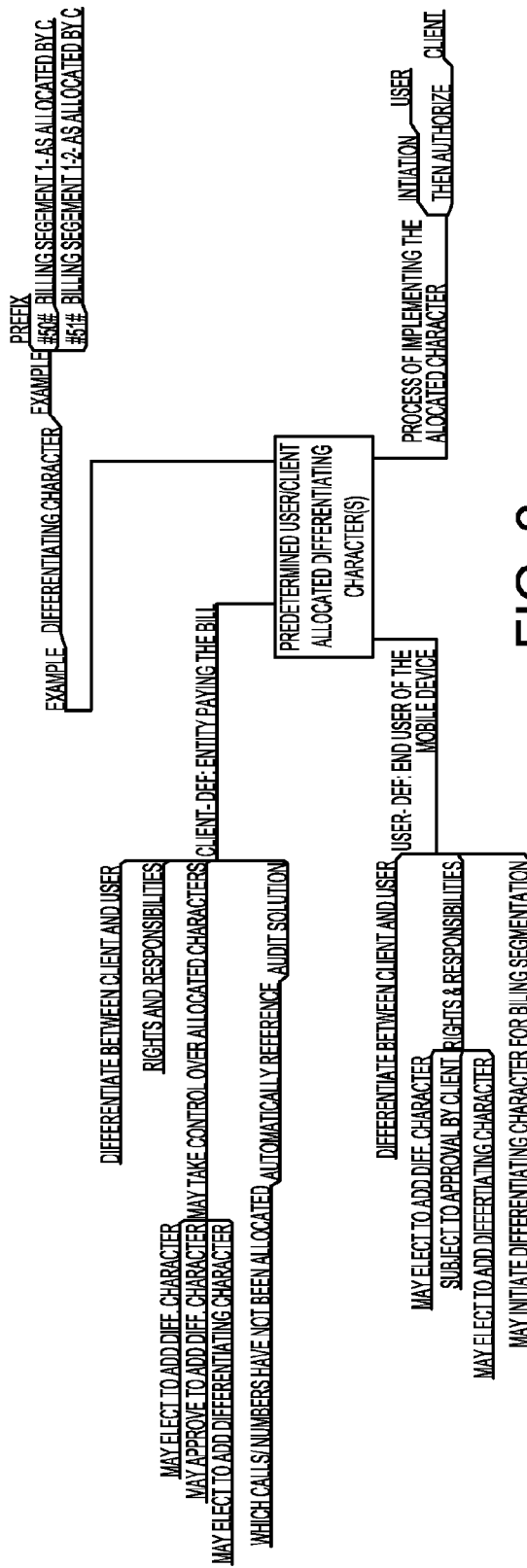
FIG. 2 shows a flowsheet of character differentiation in accordance with the present invention.
Figure 3:
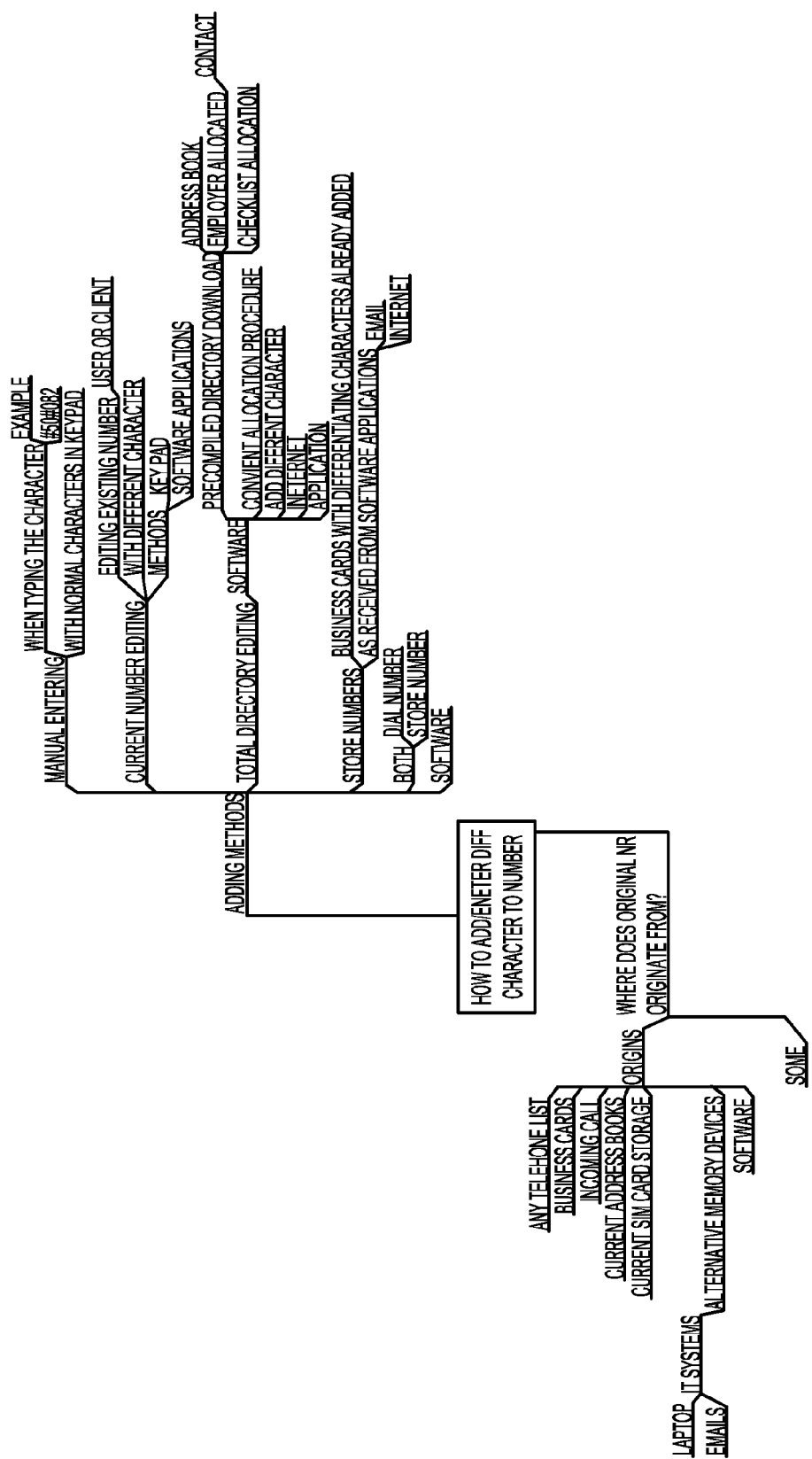
FIG. 3 shows a flowsheet of number-character associations in accordance with the present invention.
Figure 4:
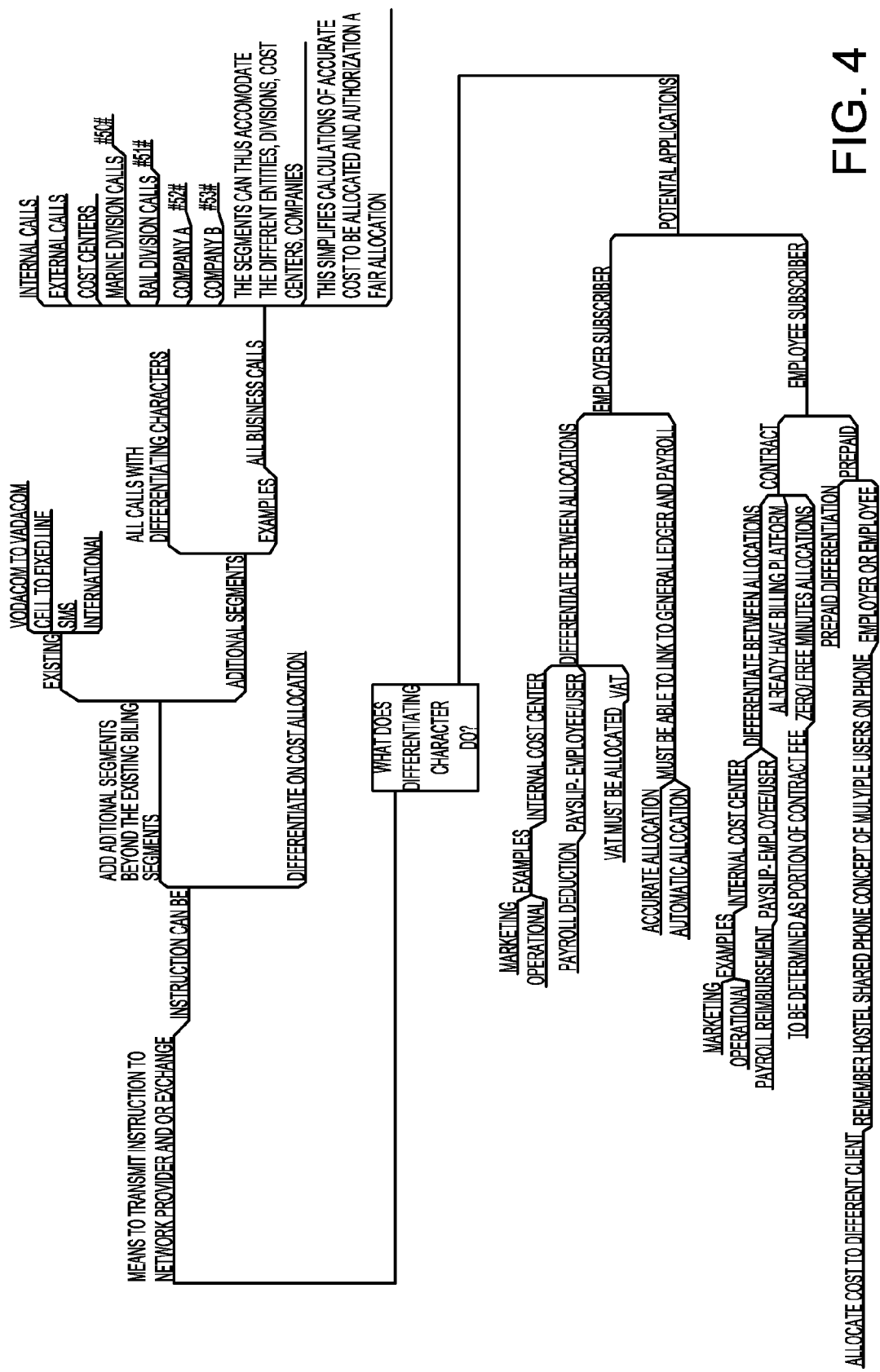
FIG. 4 shows a flowsheet of character differentiating functions in accordance with the present invention.
Figure 5:
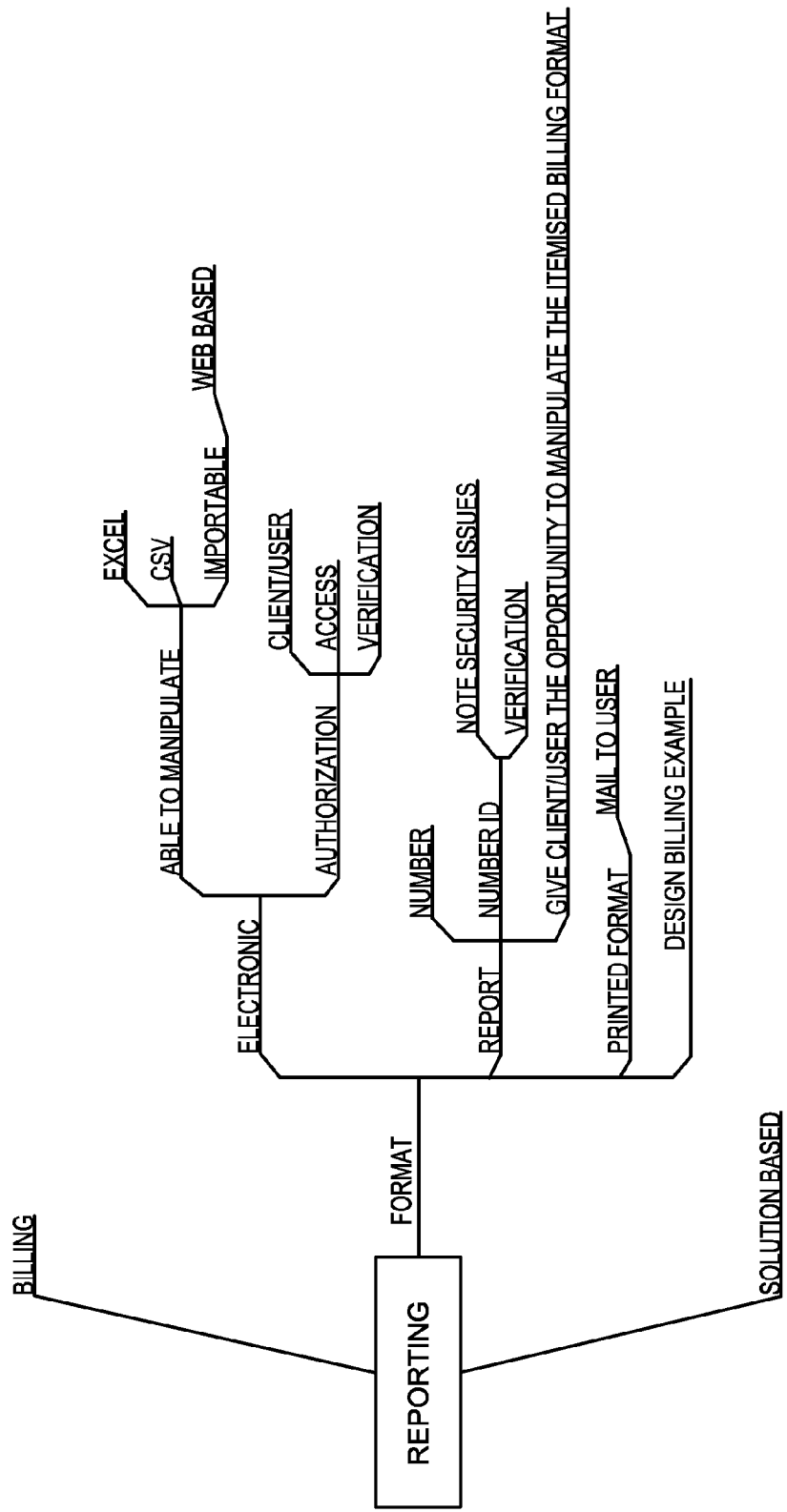
FIG. 5 shows a flowsheet of reporting in accordance with the present invention.
Figure 6:
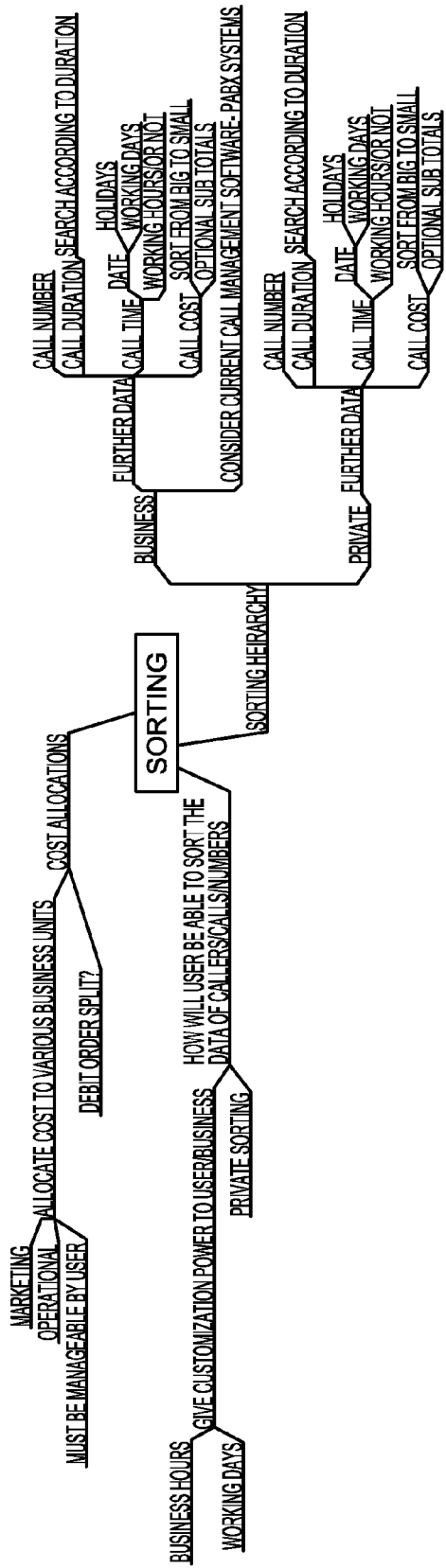
FIG. 6 shows a flowsheet of sorting in accordance with the present invention.
Figure 7A:
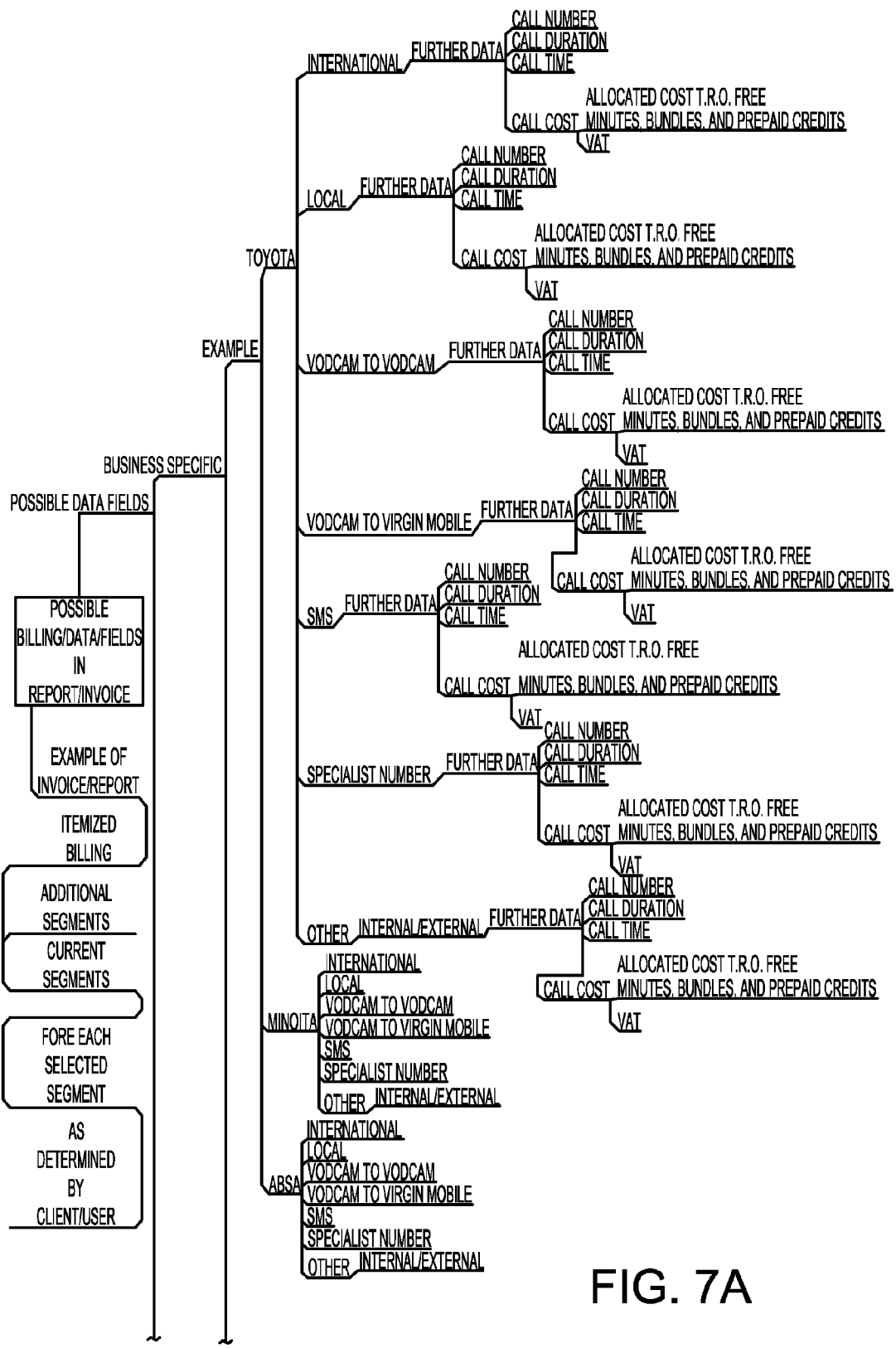
FIGS. 7a-7b show a flowsheet of possible billing/data/fields in reports/invoices in accordance with the present invention.
Figure 7B:
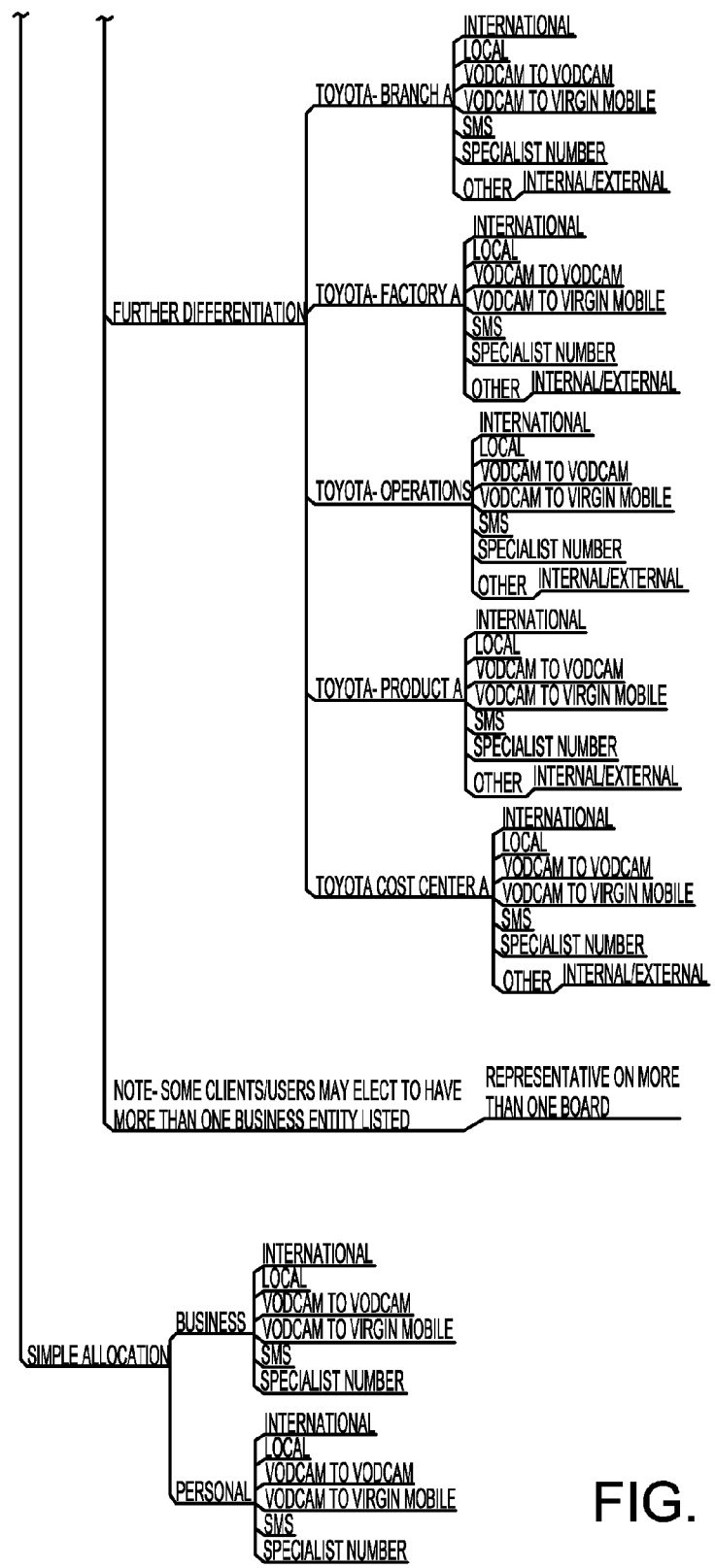
Figure 8:
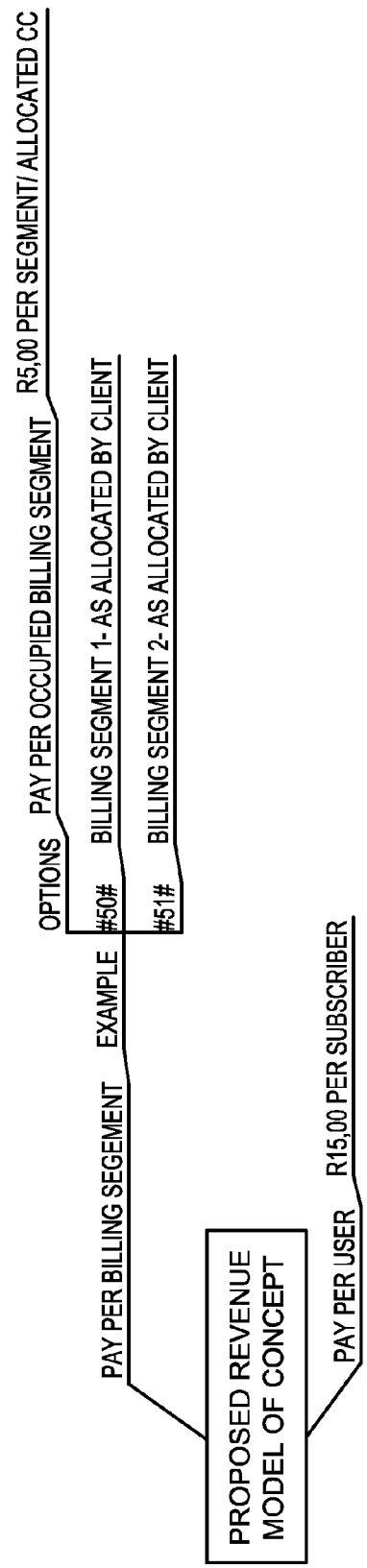
FIG. 8 shows a flowsheet of revenue in accordance with the present invention.
Figure 9:
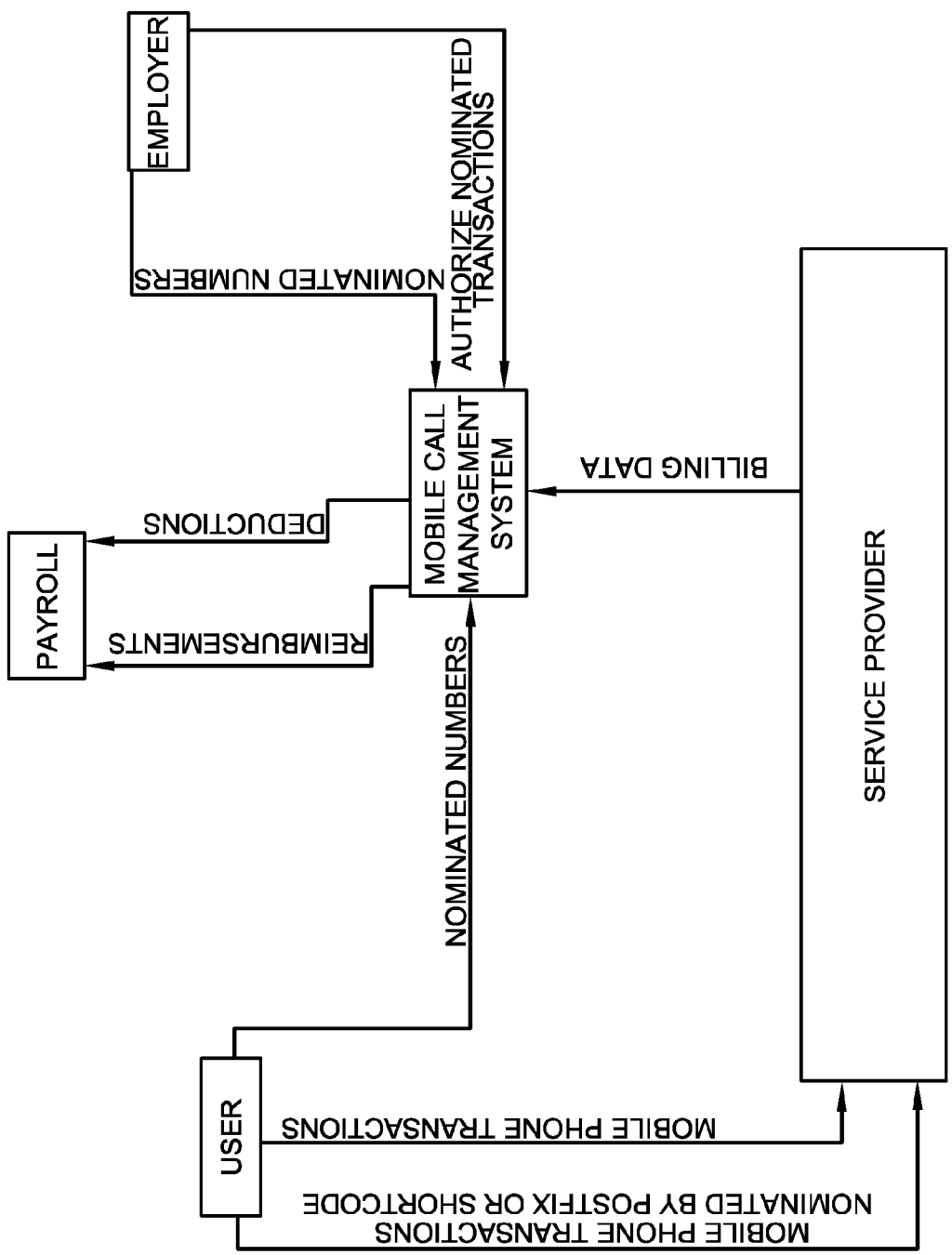
FIG. 9 shows a flowsheet of an overview of a mobile call management system in accordance with the present invention.

FIG. 9 provides an overview of a mobile call management system of the invention which includes a user, employer, service provider and the payroll.

The system allows the employer to nominate numbers and authorize nominated transactions on the system.

The user makes calls or other mobile originating transactions including data which identify the transaction or call to the system.

The service provider receives the identifying data from the user at the time the call is initiated or transaction performed and this data is then used to generate billing data which the system can use to categorise the calls and mobile transactions.

The system then categorises or sorts the transactions into various categories as required by the employer and/or user and then transfers information to the payroll system on which calls and/or mobile transactions should be reimbursed to the user or which deductions should be applied against the users pay on the payroll.

The system also apportions VAT, allowances, permitted personal calls and the like prior to transferring the data to the payroll system.

Example as Shown in FIGS. 1 to 8

The system may be implemented in a car manufacturing and distribution chain as follows.
Toyota—Branch A
   International
   Local
   Vodacom to Vodacom
   Vodacom to Virgin Mobile
   SMS
   Specialist numbers
   Other
Toyota Factory A
   International
   Local
   Vodacom to Vodacom
   Vodacom to Virgin Mobile
   SMS
   Specialist numbers
   Other
Toyota Operations
   International
   Local
   Vodacom to Vodacom
   Vodacom to Virgin Mobile
   SMS
   Specialist numbers
   Other
Toyota Product A
   International
   Local
   Vodacom to Vodacom
   Vodacom to Virgin Mobile
   SMS
   Specialist numbers
   Other
Toyota Cost center A
   International
   Local
   Vodacom to Vodacom
   Vodacom to Virgin Mobile
   SMS
   Specialist numbers
   Other The allocation of call costs on a statement may be as follows:
Business
   International
   Local
   Vodacom to Vodacom
   Vodacom to Virgin Mobile
   SMS
   Specialist numbers
Personal
   International
   Local
   Vodacom to Vodacom
   Vodacom to Virgin Mobile
   SMS
   Specialist numbers The allocation of costs may be on a billing segment basis, which billing segments are activated by the use of codes in the form # XX#.
Options
   Pay per occupied billing segment
      R5.00 per segment/Allocated cost
  #50#
   Billing Segment 1—as allocated by Client
  #51#
   Billing Segment 2—as allocated by Client The system may have the following advantages to the user thereof:
If employee
   can claim expenses from employer(s)
      official calls Convenience in cost allocated
  Time saving
Identify relevant official items on call directory
  official calls
  Call screening
  Caller ID—stating official calls
Address book storage
If employer
  can allocate expenses to employee(s)
    private calls
Convenience in cost allocated
  Time saving
  System integration
    general ledger
    payroll
ID relevant official items on call directory
  official calls
  Call screening
  Caller ID—stating official calls
Address book storage
Internal cost center
  Examples
    Marketing
    Operational
Payslip—employee/user
  Payroll reimbursement
Payslip—employee/user
  Payroll deduction
VAT
  VAT must be allocated
Thus calls may be divided into segments, for example:
All Business calls
  Internal calls
  External Calls
  Cost Centers
  Marine Division Calls
    #50#
  Rail Division Calls
    #51#
  Company A
    #52#
  Company B
    #53#
  The segments can thus accommodate the different entities, divisions, cost centers, companies
  This simplifies calculation of accurate cost to be allocated and authorization a fair allocation
As regards business management, the system has the following advantages:
Convenience in cost allocated
  Time saving
Identifying relevant official items on call directory
  official calls
  Call screening
  Caller ID—stating official calls
Address book storage
Time saver
Accuracy
In achieving the above, the software allows:
Address book storage
  Backup
Cost center allocation
Sorting
  By number
  By name
  By time called
  By Duration
  By value
Furthermore, the system provides for:
  Able to Manipulate
    Excel
    CSV
    Importable
      Web based
  Authorization
    Client/user
    Access
    Verification
On prepaid phone systems the application of the system allows:
  Prepaid Differentiation
  Employer or Employee
    hostel shared phone concept of multiple users on phone
      allocate cost to different clients

The invention claimed is:

1. A method for marking mobile originating connectivity transactions which facilitates identification and classification of marked connectivity transactions in service provider billing and bill analysis, said method including marking of said transactions by transmitting a user code when the transaction is initiated, during the duration thereof, or at the termination thereof, wherein the bill analysis is performed by a consumer in which case the consumer downloads billing information including marked transactions from the service provider and utilises software and a database to classify said transactions at least into two categories, wherein the user code is not recognised by the service provider but is analysed by the user when the billing information has been downloaded.

2. A method as claimed in claim 1, wherein connectivity transactions are calls and/or data transmission.

3. A method as claimed in claim 1, wherein a code is appended either as a prefix or a postfix to a telephone number when it is transmitted to the service provider for the call to be connected.

4. A method as claimed in claim 3, wherein an associated home database is suitably made to store information on which identity is activated, so that calls can be set up, cost information stored and so forth in a correct way in relation to the identities.

5. A method as claimed in claim 4, wherein the activation takes place in connection with the input of a so-called PIN code and wherein each identity is allocated a special code.

6. A method as claimed in claim 3, wherein the subscriber identity module is so designed that the selective identity activation is carried out with the aid of keys or the like provided on the subscriber unit.

7. A method as claimed in claim 6, wherein the PIN code is supplemented with code elements for selecting the desired identity.

8. A method as claimed in claim 3, wherein the subscriber identity module identifies the identity activation with the aid of special means provided on the subscriber identity module, the special means including one or more touch contacts when the module is an active card.

9. A method as claimed in claim 3, wherein when there is an outgoing call, the selected and activated identity is used together with the allocated directory number in a conventional manner.

10. A method as claimed in claim 3, wherein for call transfer, use is made of a function of the type 'Call Forwarding Unconditional' (CFU), which is a well-known standard function adapted to be controlled by the subscriber together with a corresponding function, controlled by the network operator, operatively associated with the home database, so that one or more of the subscriber's directory numbers can be supplemented for direct transfer in the event of the associated identity being non-activated and provided that the subscriber has not himself made any arrangements for other direct call transfer.

11. A method as claimed in claim 1, wherein the code is a system code which is recognised by the service provider thereby grouping charges on the billing system according to the codes.

12. A method as claimed in claim 11, wherein an allocation of directory information in the database is performed by one or more of the following methods:
   i. different identities of the subscriber identity module are allocated to one and same directory number and the home database is designed to allocate cost information for the current combination of directory number and identity;
   ii. different identities of the subscriber identity module are each allocated to a unique directory number of which one particular number is the subscriber's external telephone number, while the other number(s) is only used in the home database and may be unknown to the subscriber and to the public; and
   iii. two of the subscriber's directory numbers may be external telephone numbers, of which one suitably is a service number and the other is a private number.

13. A method as claimed in claim 1, in which a subscriber identity module is allocated at least two different identities which are selectively activated by the user.

14. A method as claimed in claim 1, wherein the service provider of the mobile telephone network is precluded from viewing private information relating to the categorization of numbers which have been dialed.

15. A call categorization system including a computer and software configured to identify connectivity transaction markers in a connectivity charges statement provided in electronic format by a service provider, said system configured to analyse the charges statement and group transactions which are marked in a predetermined manner in accordance with rules set in the software, wherein in one mode, the system operates by means of authorized and unauthorised lists of numbers in relation to a user identity, the connectivity transaction markers being one or more codes provided when the transaction is initiated, during the duration thereof, or at the termination thereof, the one or more codes being user codes which are not recognised by the service provider.

16. A system as claimed in claim 15, wherein the user marks a number as authorized, however, the account payer may have to verify that a number is indeed authorized before it becomes a permanent part of the authorized list.

17. A system as claimed in claim 15, wherein it is possible for a number to be authorized for a limited period only.

18. A system as claimed.. in claim 17, wherein a number is automatically deemed to be unauthorized outside authorized hours and/or outside authorised days.

19. A system as claimed in claim 15, wherein the authorized list is modifiable manually from a handset or from software once the list of called numbers which have been billed has been downloaded.

20. A system as claimed in claim 15, which allocates the actual cost of free calls and included calls according to the authorised and unauthorised lists, or according to any other classification rules together with the actual costs of the included calls for accounting purposes.

21. A method for marking mobile originating connectivity transactions which facilitates identification and classification of marked connectivity transactions in service provider billing and bill analysis, said method including marking of said transactions by transmitting a user code when the transaction is initiated, during the duration thereof, or at the termination thereof, wherein the said transaction is marked with the user code by the service provider for inclusion in billing information for analysis by the user when the billing information had been downloaded but the user code is not recognized for classification by the service provider, and wherein the bill analysis is performed by a consumer in which case the consumer downloads billing information including marked transactions from the service provider and utilises software and a database to classify said transactions at least into two categories.

* * * * *